(12) United States Patent
Fukutomi

(10) Patent No.: US 8,982,251 B2
(45) Date of Patent: Mar. 17, 2015

(54) IMAGE PROCESSING APPARATUS, IMAGE PROCESSING METHOD, PHOTOGRAPHIC IMAGING APPARATUS, AND RECORDING DEVICE RECORDING IMAGE PROCESSING PROGRAM

(71) Applicant: Olympus Corporation, Tokyo (JP)

(72) Inventor: Takeshi Fukutomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 27 days.

(21) Appl. No.: 13/937,535

(22) Filed: Jul. 9, 2013

(65) Prior Publication Data

US 2013/0293748 A1    Nov. 7, 2013

Related U.S. Application Data

(63) Continuation of application No. PCT/JP2011/077476, filed on Nov. 29, 2011.

(30) Foreign Application Priority Data

Jan. 20, 2011 (JP) .................... 2011-009785

(51) Int. Cl.
- *H04N 5/202* (2006.01)
- *H04N 5/243* (2006.01)
- *H04N 1/407* (2006.01)
- *G06T 5/00* (2006.01)
- *H04N 5/235* (2006.01)

(52) U.S. Cl.
CPC ............... *H04N 5/243* (2013.01); *H04N 1/407* (2013.01); *G06T 5/007* (2013.01); *H04N 5/2355* (2013.01)
USPC .......................................... 348/254

(58) Field of Classification Search
None
See application file for complete search history.

(56) References Cited

U.S. PATENT DOCUMENTS

| 5,455,621 | A | 10/1995 | Morimura |
| 6,023,533 | A * | 2/2000 | Sano et al. ................... 382/274 |
| 2006/0177148 | A1 | 8/2006 | Sumiya et al. |
| 2010/0194934 | A1 | 8/2010 | Fukutomi |
| 2011/0013848 | A1* | 1/2011 | Hasegawa ................... 382/232 |
| 2011/0090372 | A1* | 4/2011 | Doida ........................... 348/239 |

FOREIGN PATENT DOCUMENTS

| JP | 06-141229 A | 5/1994 |
| JP | 2004-266347 A | 9/2004 |
| JP | 2008-060855 A | 3/2008 |
| JP | 2010-183182 A | 8/2010 |

* cited by examiner

OTHER PUBLICATIONS

International Search Report (ISR) dated Feb. 14, 2012 (and English translation thereof) issued in International Application No. PCT/JP2011/077476.

*Primary Examiner* — Anthony J Daniels
(74) *Attorney, Agent, or Firm* — Holtz, Holtz, Goodman & Chick PC

(57) ABSTRACT

An image processing apparatus includes: a gray-scale conversion characteristic deriving unit configured to set reference image data out of a plurality of input image data obtained by shooting an identical object with a different amount of exposure and derive a gray-scale conversion characteristic from the reference image data; and an image synthesis processing unit configured to derive a new pixel value for each pixel using a pixel value of one or more input image data selected from a plurality of the input image data based on the gray-scale conversion characteristic to create synthesized image data.

11 Claims, 10 Drawing Sheets

IMAGE PROCESSING APPARATUS, IMAGE PROCESSING METHOD, PHOTOGRAPHIC IMAGING APPARATUS, AND RECORDING DEVICE RECORDING IMAGE PROCESSING PROGRAM

CROSS REFERENCE TO RELATED APPLICATIONS

This application is a continuation of International Patent Application No. PCT/JP2011/77476, filed on Nov. 29, 2011, which claims the benefit of Japanese Patent Application No. JP 2011-9785, filed on Jan. 20, 2011, which are incorporated by reference as if fully set forth.

FIELD OF THE INVENTION

The present invention relates to a technology of obtaining an image having an improved gray scale (gradation) by synthesizing image data for a plurality of frames obtained by shooting an identical object with a different amount of exposure.

BACKGROUND OF THE INVENTION

In a back light shooting condition under an open-air clear sky, an object luminance range within a scene (hereinafter, simply referred to as a "luminance range") is widened. When the object having a wide luminance range is shot using a digital camera, the resulting scene may not be suitable for a dynamic range recordable by a photographic imaging system or an image signal processing system. In this case, a so-called shadow phenomenon in which an image is blocked up occurs in a dark portion of an image. Similarly, a so-called highlight phenomenon in which an image is blown out occurs in a bright portion of an image.

As a technique for avoiding such a phenomenon, there is known a high dynamic range imaging technique (hereinafter, referred to as a "HDR technique"). In the HDR technique, a shooting is performed several times for an identical scene by changing a shutter speed so that a plurality of image data are obtained with a different amount of exposure. Then, a synthesis processing is performed such that a pixel value of the image data obtained with a relatively large amount of exposure is used in an area where a shadow phenomenon may occur in an image, and a pixel value of the image data obtained with a relatively small amount of exposure is used in an area where a highlight phenomenon may occur. As a result, it is possible to obtain an image in which a gray scale is appropriately reproduced from a dark portion to a bright portion.

Japanese Patent Application Laid-open No. 06-141229 (JP06-141229A) discloses a technique of obtaining two or more images with a different electric charge storing time, adding the two or more images by applying a weight depending on a signal level of each image, and compressing the obtained signal level having a wide dynamic range to a reference level.

In the technique disclosed in Japanese Patent Application Laid-open No. 06-141229, it is necessary to increase a bit width (bit depth) when a plurality of signals are synthesized. For this reason, a necessary hardware size increases. In order to address such a problem, Japanese Patent Application Laid-open No. 2004-266347 (JP2004-266347A) discloses a technique of suppressing increase of the bit width (number of bits) of the image signal by performing a process of non-linearly compressing a high level part of the image signal and then synthesizing a plurality of images with a predetermined weight.

SUMMARY OF THE INVENTION

According to an embodiment of the present invention, there is provided an image processing apparatus including: a gray-scale conversion characteristic deriving unit configured to set reference image data out of a plurality of input image data obtained by shooting an identical object with a different amount of exposure and derive a gray-scale conversion characteristic from the reference image data; and an image synthesis processing unit configured to derive a new pixel value for each pixel using a pixel value of one or more input image data selected from a plurality of the input image data based on the gray-scale conversion characteristic to create synthesized image data.

According to another embodiment of the present invention, there is provided an image processing method including: setting reference image data from a plurality of input image data obtained by shooting an identical object with a different amount of exposure; deriving a gray-scale conversion characteristic from the reference image data; and deriving a new pixel value for each pixel using a pixel value of one or more input image data selected from a plurality of the input image data based on the gray-scale conversion characteristic to create synthesized image data.

According to still another embodiment of the present invention, there is provided a computer readable recording device having an image processing program encoded and recorded in a computer readable format to create synthesized image data having an improved gray scale by synthesizing a plurality of input image data obtained by shooting an identical object with a different amount of exposure, wherein the image processing program causes a computer to execute a method including: setting reference image data from a plurality of input image data; deriving a gray-scale conversion characteristic from the reference image data; and deriving a new pixel value for each pixel using a pixel value of one or more input image data selected from a plurality of the input image data based on the gray-scale conversion characteristic to create synthesized image data.

According to further another embodiment of the present invention, there is provided a photographic imaging apparatus including: an image pickup unit capable of photoelectrically converting an object image formed by a photographic lens to output an image signal; a shooting control unit configured to obtain a plurality of input image data by shooting an identical object with a different amount of exposure using the image pickup unit; a grayscale conversion characteristic deriving unit configured to set reference image data out of a plurality of the input image data and derive a gray-scale conversion characteristic from the reference image data; and an image synthesis processing unit configured to derive a new pixel value for each pixel using a pixel value of one or more input image data selected from a plurality of the input image data based on the gray-scale conversion characteristic to create synthesized image data.

The foregoing and additional features and characteristics of this disclosure will become more apparent from the following detailed description considered with the reference to the accompanying drawings.

DESCRIPTION OF THE PREFERRED EMBODIMENT

Figure 1:
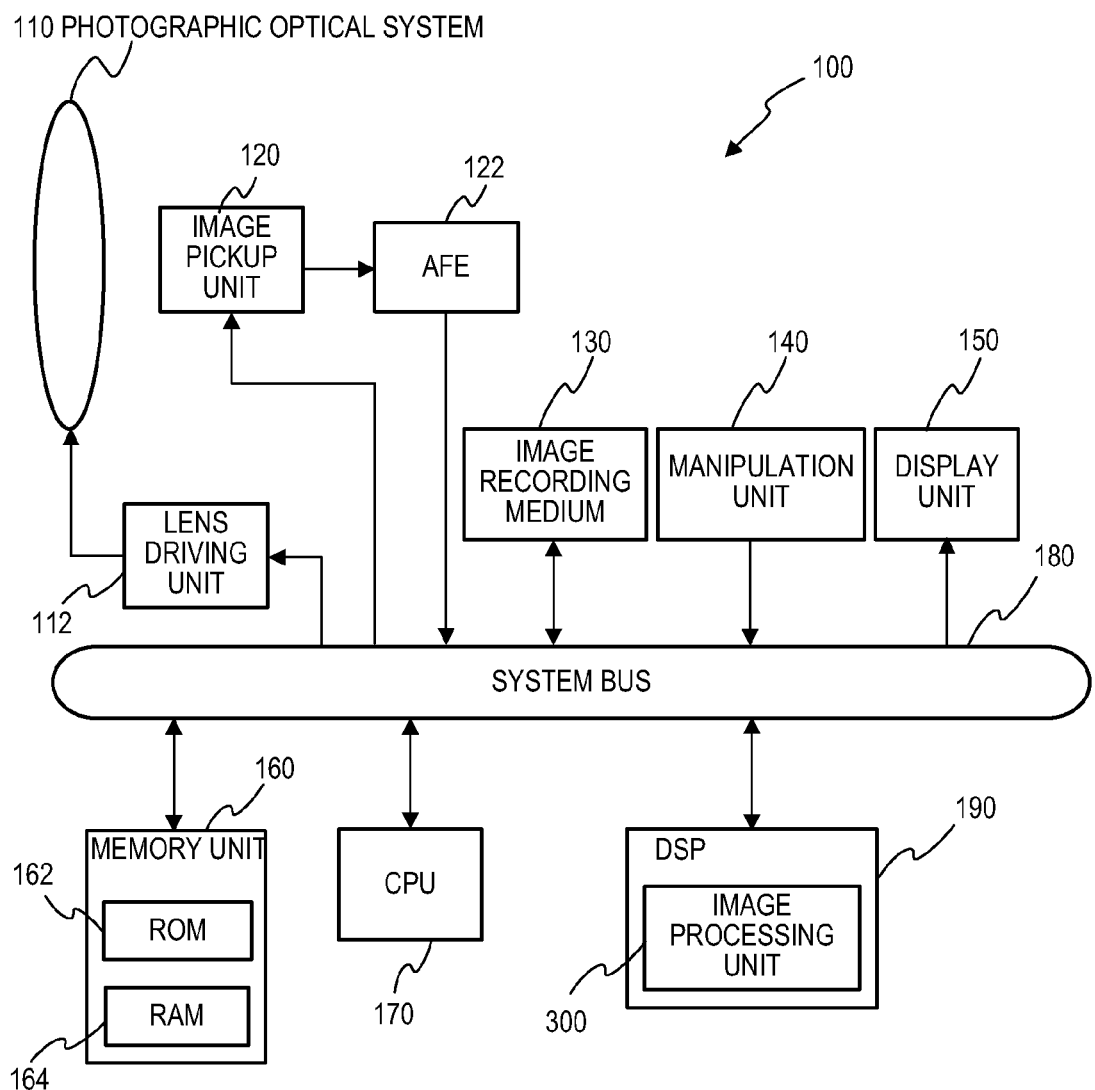
FIG. 1 is a block diagram illustrating a schematic configuration of a digital camera.

FIG. 1 is a block diagram illustrating a schematic configuration of a digital camera 100. The digital camera 100 may be a still camera or a movie camera. The digital camera 100 may be integrated into a mobile phone and the like. When the digital camera 100 is a still camera or a movie camera, a photographic lens may be a fixed type or an exchangeable type.

The digital camera 100 includes: a photographic optical system 110; a lens driving unit 112; an image pickup unit 120; an analog front end (denoted by "AFE" in FIG. 1) 122; an image recording medium 130; a manipulation unit (operation unit) 140; a display unit 150; a memory unit 160; a central processing unit (CPU) 170; a digital signal processor (DSP) 190; and a system bus 180. The memory unit 160 includes a read-only memory (ROM) 162 and a random access memory (RAM) 164. An image processing unit 300 is integrated into the DSP 190.

The lens driving unit 112, the image pickup unit 120, the analog front end 122, the image recording medium 130, the manipulation unit 140, the display unit 150, the memory unit 160, the CPU 170, and the DSP 190 are electrically connected to one another via a system bus 180. The RAM 164, are accessible from both of the CPU 170 and the DSP 190.

The photographic optical system 110 forms an object image on a light-receiving area of the image pickup unit 120. The lens driving unit 112 performs a focal point adjustment operation of the photographic optical system 110. In a case where the photographic optical system 110 is a variable focal point optical system, the photographic optical system 110 may be driven by the lens driving unit 112 to change a focal length.

The image pickup unit 120 includes a mechanical shutter and an image pickup element. An object image transmitting through the photographic optical system 110 is incident to the image pickup element while the shutter is opened. The object image formed on the light-receiving area of the image pickup element is photoelectrically converted to generate an analog image signal. In a case where the image pickup element has an electronic shutter capable of electrically controlling an exposure time (photoelectrical conversion time), the mechanical shutter may be dispensable. The analog image signal is input to the analog front end 122. The analog front end 122 performs noise reduction, signal amplification, analog/digital (A/D) conversion, and the like to the image signal input from the image pickup unit 120 so as to generate a digital image signal. This digital image signal is temporarily stored in the RAM 164.

The DSP 190 applies various digital signal processings such as demosaicing, gray-scale conversion, color balance correction, shading correction, and noise reduction to the digital image signal temporarily stored in the RAM 164. In addition, the DSP 190 records the digital image signal in the image recording medium 130 or outputs the digital image signal to the display unit 150 as necessary.

The image recording medium 130 includes a flash memory, a magnetic recording device, and the like and is detachably installed in the digital camera 100. Alternatively, the image recording medium 130 may be integrated into the digital camera 100. In this case, an area for recording image data may be prepared inside the ROM 162 including a flash memory and the like and may be used as the image recording medium 130.

The manipulation unit 140 includes any one of or a plurality of types including a push switch, a slide switch, a dial switch, a touch panel, and the like to receive user manipulation. The display unit 150 includes a thin-film transistor (TFT) liquid crystal display panel and a backlight unit. The display unit 150 may include a self-emissive type display device such as an organic electroluminescence display device to display information such as images, text, and the like. In addition, the display unit 150 has a display interface, so that the image data written to a video RAM (VRAM) area provided in the RAM 164 is read by the display interface to display information such as images or text on the display unit 150.

The ROM 162 includes a flash memory or the like and stores a control program (firmware) executed by the CPU 170, an adjustment parameter, information necessary to be stored while the digital camera 100 is powered off, and the like. The RAM 164 includes a synchronous dynamic RAM (SDRAM) or the like and is accessible at a relatively high speed. The CPU 170 analyzes and executes the firmware transmitted from the ROM 162 to the RAM 164 and generally controls the operation of the digital camera 100.

The DSP 190 applies various processings described above to the digital image signal temporarily stored in the RAM 164 to generate recording image data, display image data, and the like.

The digital camera 100 is configured to execute an operation of shooting a still image in a high dynamic range (HDR) shooting mode. That is, the digital camera 100 may be operated such that a plurality of image data are obtained by shooting the identical object with a different amount of exposure, and synthesized image data having an improved gray scale are created from a plurality of the image data. Naturally, the digital camera 100 may perform a moving picture shooting in the HDR shooting mode. In this case, the shooting is performed by changing the amount of exposure at a frame rate higher than the recording frame rate of the moving picture, and image data for a single frame is created from a plurality of the obtained image data so that created image data is recorded. By the way, in order to obtain higher quality synthesized image data, the shooting may be performed using the same composition when the identical object is shot with a different amount of exposure as described above. That is, a plurality of images obtained through a series of shootings have the same scene except that the amount of exposure is different. However, in some cases, a shooting range may slightly change during the shooting operation if the handheld shooting is performed, or a position or shape of the object may change within the scene if the object is movable. In such cases, processings such as image cutting or pasting may be performed based on a pattern matching technique to synthesize an image.

When the shooting operation is performed by changing the amount of exposure as described above, the CPU 170 controls the image pickup unit 120 such that a determined number of exposure processes are performed with the amount of exposure determined for each exposure process. That is, the CPU 170 controls the image pickup unit 120 such that the identical object is shot with a different amount of exposure to obtain a plurality of image data.

The digital camera 100 may have a plurality of photographic imaging systems, each of which includes the photographic optical system 110, the lens driving unit 112, the image pickup unit 120, and the like. In this case, it is possible to approximately simultaneously obtain images from each photographic imaging system with a different amount of exposure using a plurality of photographic imaging systems in response to a single release manipulation from a user. Using this configuration, it is possible to obtain a plurality of images with a different amount of exposure for each frame at the time of the moving picture shooting.

Alternatively, the digital camera 100 may include a plurality of image pickup units 120. In this case, a beam splitter (optical path splitting member) may be disposed in the rear side of the photographic optical system 110, and the image pickup units 120 may be disposed on a plurality of optical paths split by the beam splitter. The beam splitter splits a light beam at an unequal splitting ratio. For example, in a case where the beam splitter splits and emits an input light beam into a pair of light beams, the beam splitter may be designed such that a ratio between a light amount of the light beam emitted along one optical path and a light amount of the light beam emitted along the other optical path is set to, for example, 1:4. In such a beam splitter configuration, a shutter speed (exposure time) or an aperture stop value set in the photographic optical system 110 has the same exposure condition for each image pickup unit 120. However, the light amount of the object light incident to each image pickup unit 120 is different due to the effect of the beam splitter. As a result, it is possible to obtain a plurality of images with a different amount of exposure through a single shooting operation. In this configuration, it is possible to obtain a plurality of images with a different amount of exposure through a single exposure operation. Using this configuration, it is possible to obtain a plurality of images with a different amount of exposure for each frame at the time of the moving picture shooting.

In order to obtain a plurality of images with a different amount of exposure, any one of the three methods described above may be employed. That is, as a first method, the exposure operation is sequentially performed several times by changing the exposure condition. As a second method, different exposure conditions are set for each of the photographic imaging systems, and the shooting is performed approximately simultaneously. As a third method, the object light is guided to a plurality of image pickup elements at a different splitting ratio using the optical path splitting member disposed in the rear side of a single photographic optical system, so that a plurality of images with a different amount of exposure are obtained through a single exposure operation.

Figure 2:
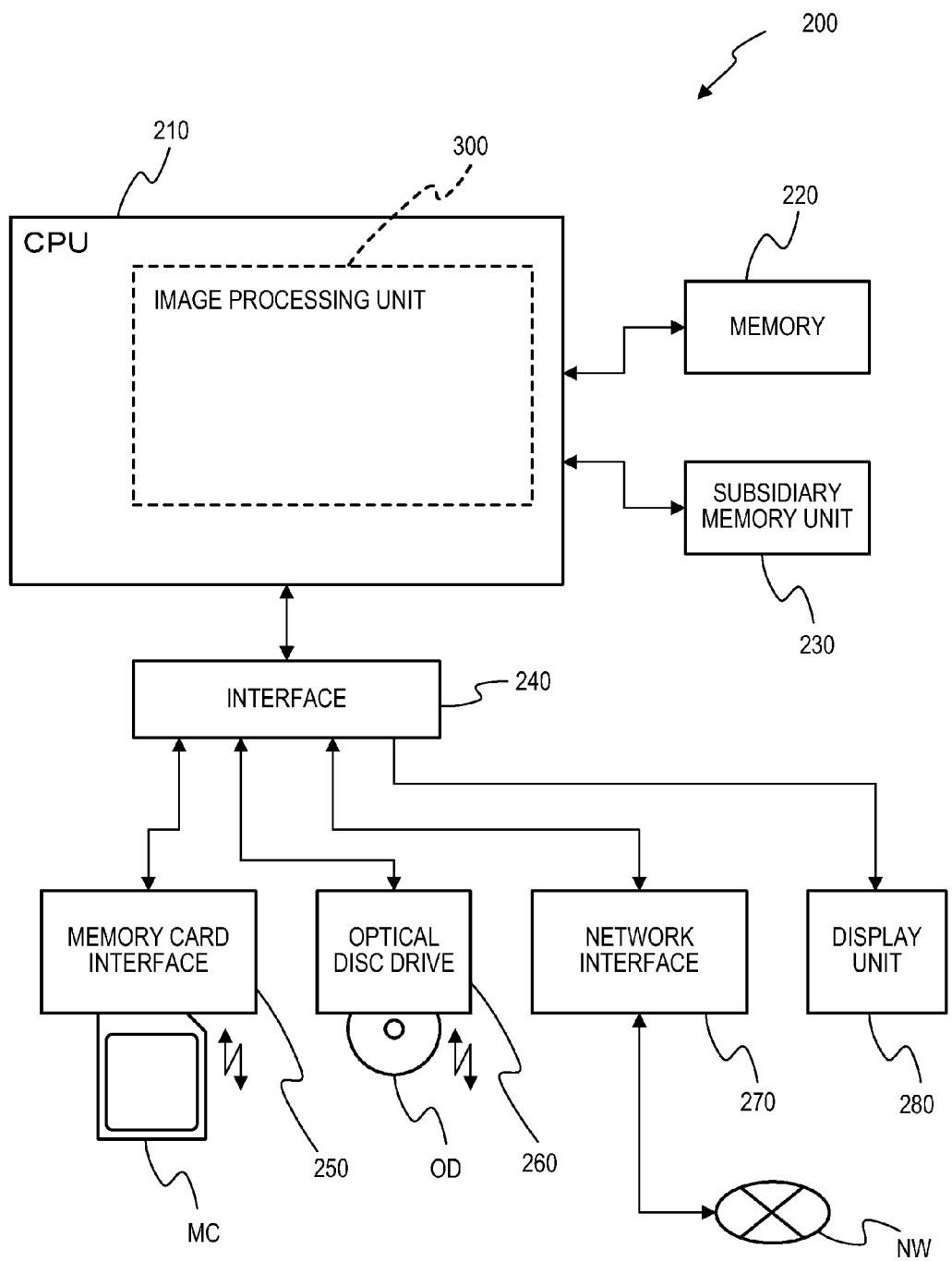
FIG. 2 is a block diagram illustrating an exemplary schematic internal configuration of a computer, in which an image processing unit is implemented by causing a computer to execute an image processing program.

FIG. 2 is a block diagram illustrating an example in which an image processing program recorded in a recording medium is read and executed by a CPU of a computer to implement a functionality of the image processing unit 300. The computer 200 includes a CPU 210, a memory 220, a subsidiary memory unit 230, an interface 240, a memory card interface 250, an optical disc drive 260, a network interface 270, and a display unit 280. The CPU 210, the memory card interface 250, the optical disc drive 260, the network interface 270, and the display unit 280 are electrically connected to one another via an interface 240.

The memory 220 is a memory accessible at a relatively high speed, such as a double data rate (DDR) SDRAM. The subsidiary memory unit 230 includes a hard disc drive or a solid-state drive (SSD) having a relatively large storage capacity.

The memory card interface 250 is configured such that the memory card MC can be detachably installed. The image data created through a shooting operation using the digital camera and the like and stored in the memory card MC may be read to the computer 200 through the memory card interface 250. Alternatively, the image data in the computer 200 may be written to the memory card MC.

The optical disc drive 260 is configured to read data from the optical disc OD. Alternatively, the optical disc drive 260 may be configured to write data onto the optical disc OD as necessary.

The network interface 270 is configured to exchange information between the computer 200 and an external information processing apparatus such as a server connected via a network NW.

The display unit 280 includes a flat panel display device and the like to display text, icons, color images, and the like.

The image processing unit 300 is implemented by causing the CPU 210 to analyze and execute the image processing program loaded on the memory 220. This image processing program is encoded and recorded in a computer readable recording device (nonvolatile computer readable recording medium) such as a memory card MC or an optical disc OD using a computer readable format and is distributed to a user of the computer 200. Alternatively, the image processing program downloaded from an external information processing apparatus such as a server via a network NW may be stored in the subsidiary memory unit 230. Alternatively, the image processing program may be downloaded from an external information processing apparatus and the like through other types of wired/wireless interfaces and may be stored in the subsidiary memory unit 230.

The image processing unit 300 executes the following image processing for the image data stored in the subsidiary memory unit 230 or the image data input through the memory card MC, the optical disc OD, the network NW, and the like. Hereinafter, the processing in the image processing unit 300 according to first and second embodiments will be described.

First Embodiment

Figure 3:
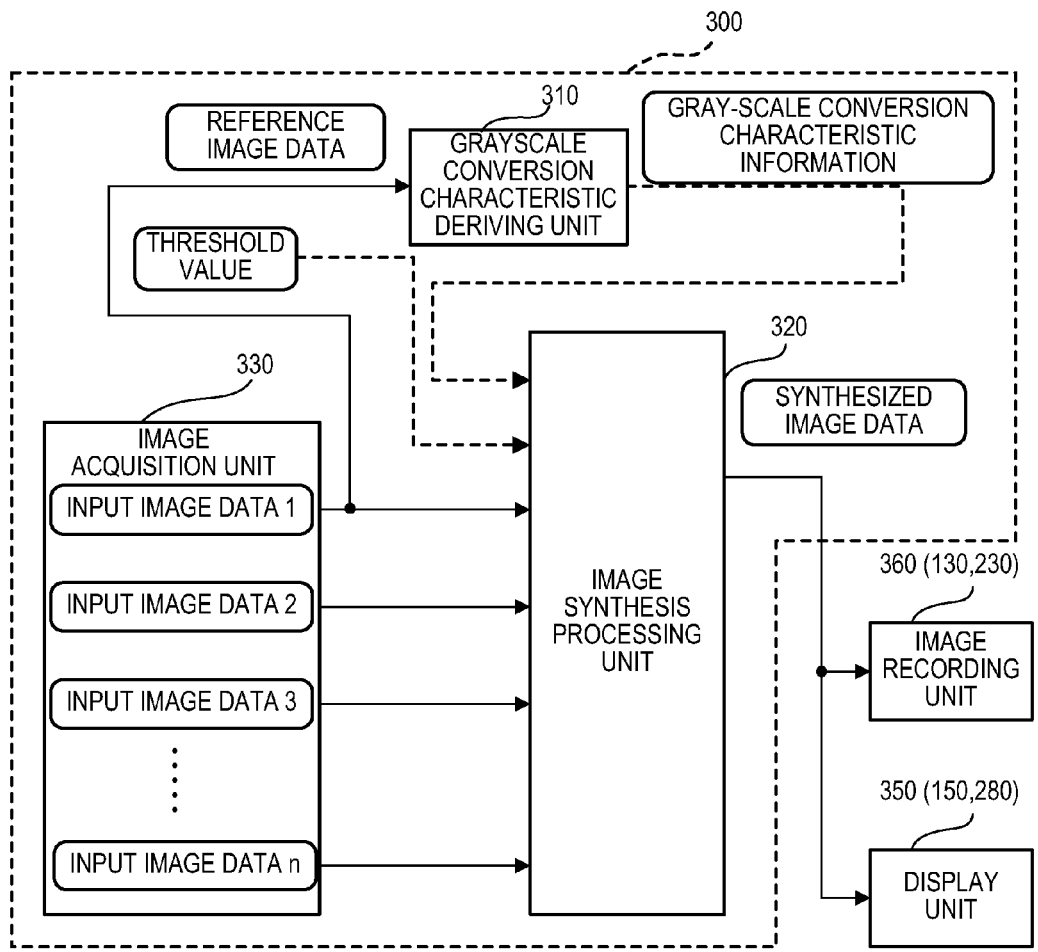
FIG. 3 is a block diagram illustrating a schematic configuration of the image processing unit.

FIG. 3 is a block diagram schematically illustrating a configuration of the image processing unit 300. As described above, the image processing unit 300 may be implemented by the DSP 190 of the digital camera 100 or may be realized by causing the CPU 210 of the computer 200 to execute the image processing program.

The image processing unit 300 includes a gray-scale conversion characteristic deriving unit 310, an image synthesis processing unit 320, and an image acquisition unit 330. The image recording unit 360 connected to the image processing unit 300 corresponds to the image recording medium 130 and the subsidiary memory unit 230 described above in conjunction with FIGS. 1 and 2. Similarly, the display unit 350 connected to the image processing unit 300 corresponds to the display unit 150 or 280.

The image acquisition unit 330 obtains a plurality of input image data by shooting the identical object with a different amount of exposure. In order to obtain a plurality of input image data with a different amount of exposure, any one of the three methods described above may be employed. In the following description, it is assumed that the first method is employed, in which exposure is sequentially performed several times by changing the exposure condition (hereinafter, the case where the identical object is sequentially shot several times with a different amount of exposure will be referred to as "exposure bracketing"). At the time of exposure bracketing, it is preferable that the amount of exposure be controlled by changing a length of the exposure time in order to obtain a plurality of images having the same motion blur or aberration. Alternatively, the amount of exposure may be controlled by changing the aperture stop value if an exposure change step (correction step) in the exposure bracketing is small so that a variation of the motion blur or aberration obtained by changing the aperture stop does not matter in most cases. Alternatively, in a case where a neutral density (ND) filter insertable/extractable to/from an optical path of the object light is provided inside the photographic optical system 110 and the like, the images with a different amount of exposure may be obtained through an insertion-extraction switching of the ND filter.

In a case where the image processing unit 300 is implemented by the DSP 190 of the digital camera 100, the image acquisition unit 330 may obtain a plurality of input image data as follows. Specifically, the image acquisition unit 330 may obtain a plurality of input image data by causing the DSP 190 to process the digital image signal sequentially output from the analog front end 122 while exposure bracketing is performed in the digital camera 100. Alternatively, the image acquisition unit 330 may obtain the input image data by reading a plurality of input image data recorded in the image recording unit 360 (image recording medium 130) through exposure bracketing in the past. In any case, the input image data may be obtained from so-called raw image data. In addition, the input image data may be image data having any format such as a red/green/blue (RGB) format or a luminance/chroma-blue/chroma-red (YCbCr) format subjected to a development process.

The number of input image data obtained by the image acquisition unit 330 may be set to any number n equal to or greater than 2. This number n may be a fixed value or a user definable value or may be automatically set based on a result obtained by detecting a luminance (brightness) distribution in an object image during a shooting preparation operation (during a live-view display operation). For example, in a case where a difference between the maximum luminance and the minimum luminance within an object image is relatively small as in a front light photographic condition under a cloudy sky, the number of exposure (number of input image data) in the exposure bracketing may be set to a relatively small value. In contrast, in a case where a difference between the maximum luminance (the brightest portion) and the minimum luminance (the darkest portion) within an object image is relatively large as in a back light photographic condition under a clear sky or a night scene, the number of exposure in the exposure bracketing may be set to a relatively large value. In this case, the correction step may be arbitrarily set by a user or may be automatically set.

For example, for convenient description purposes, assuming that the correction step is set to 1 Ev, and the number of exposure is set to 5, the amounts of exposure may be set to +0 Ev (×1), +1 Ev (×2), +2 Ev (×4), +3 Ev (×8), and +4 Ev (×16) with respect to the smallest amount of exposure. In the following description, it is assumed that the amount of exposure for obtaining input image data 2, input image data 3, . . . , and input image data n increases stepwise with respect to the amount of exposure for obtaining the input image data 1. From such input image data, a pixel value P(i,j) is obtained for a pixel position (i,j). Hereinafter, pixel values of input image data 1, input image data 2, . . . , and input image data n in a predetermined pixel position (i,j) will be denoted by $P_1(i,j)$, $P_2(i,j)$, . . . , and $P_n(i,j)$. In addition, input image data 1, input image data 2, . . . , and input image data n will be collectively denoted by input image data 1 to n. It is noted that the correction step or the number of exposure described above may be arbitrarily set depending on an object or a purpose of a photographic work. In the correction step, the amount of exposure may be set to change at an equal or unequal interval.

The gray-scale conversion characteristic deriving unit 310 selects one of a plurality of input image data 1 to n obtained by the image acquisition unit 330 as reference image data and analyzes the reference image data to derive a gray-scale conversion characteristic. Various methods may be employed to select the reference image data. For example, the input image data obtained with the smallest amount of exposure out of a plurality of input image data obtained through a series of exposure bracketing processes may be set to the reference image data. Alternatively, the input image data obtained with an intermediate amount of exposure or the input image data obtained with the largest amount of exposure may also be set to the reference image data. Alternatively, a histogram for a plurality of input image data may be analyzed, and the input image data having a pixel value distribution with a center not excessively biased to a bright side or a dark side may be set to the reference image data. According to the present embodiment, it is assumed that, for example, the image data (input image data 1) obtained by setting the amount of exposure to the smallest value is set to the reference image data. The gray-scale conversion characteristic deriving unit 310 derives gray-scale conversion characteristic information corresponding to each pixel value included in the reference image data based on the derived gray-scale conversion characteristic.

The gray-scale conversion characteristic and the gray-scale conversion characteristic information will be described in detail below.

The image synthesis processing unit 320 creates synthesized image data based on a plurality of input image data 1 to n. A method of creating the synthesized image data will be described below. Specifically, the image synthesis processing unit 320 selects a pixel value of any one of a plurality of input image data 1 to n to determine the pixel value of each pixel included in the synthesized image data. For example, assuming that a coordinate value of the upper left corner pixel position of the synthesized image data is set to (1, 1), a candidate for the pixel value of the pixel position (1, 1) is the pixel value in the upper left corner pixel position (1, 1) of each of the input image data 1 to n. The image synthesis processing unit 320 determines any one of pixel values out of the n candidates as a pixel value in the corresponding position of the synthesized image data. The synthesized image data is created by performing this processing for overall pixel positions (i,j).

The image synthesis processing unit 320 compares the gray-scale conversion characteristic information derived by the gray-scale conversion characteristic deriving unit 310 for each pixel with a threshold value and selects any one of the n candidates based on the comparison result. The threshold value input to the image synthesis processing unit 320 may be automatically set depending on the number of exposure and the correction step of exposure bracketing. Alternatively, this threshold value may be appropriately set by a user. Hereinafter, description will be made for the gray-scale conversion characteristic, the gray-scale conversion characteristic information, and the threshold value.

When the synthesized image data is created, a pixel value of the input image data obtained with a relatively large amount of exposure is selected for a shadow portion having a low luminance. The input image data obtained with a relatively large amount of exposure has relatively a lot of gray-scale information in a dark portion, so that it is possible to reduce noise influence.

In contrast, for a highlight portion having a high luminance, a pixel value of the input image data obtained with a relatively small amount of exposure is selected. The input image data obtained with a relatively small amount of exposure is characterized in that the gray-scale information in a bright portion is relatively rich.

If each pixel value of the synthesized image data is selected as described above, it is possible to reproduce a gray scale in both the shadow portion and the highlight portion in the image formed from the synthesized image data. In addition, it is possible to reduce noise influence in the shadow portion. In this manner, the threshold value and the gray-scale conversion characteristic information are set such that a gray scale (gradation or tone) is more naturally reproduced when the synthesized image data is created.

Figure 4:
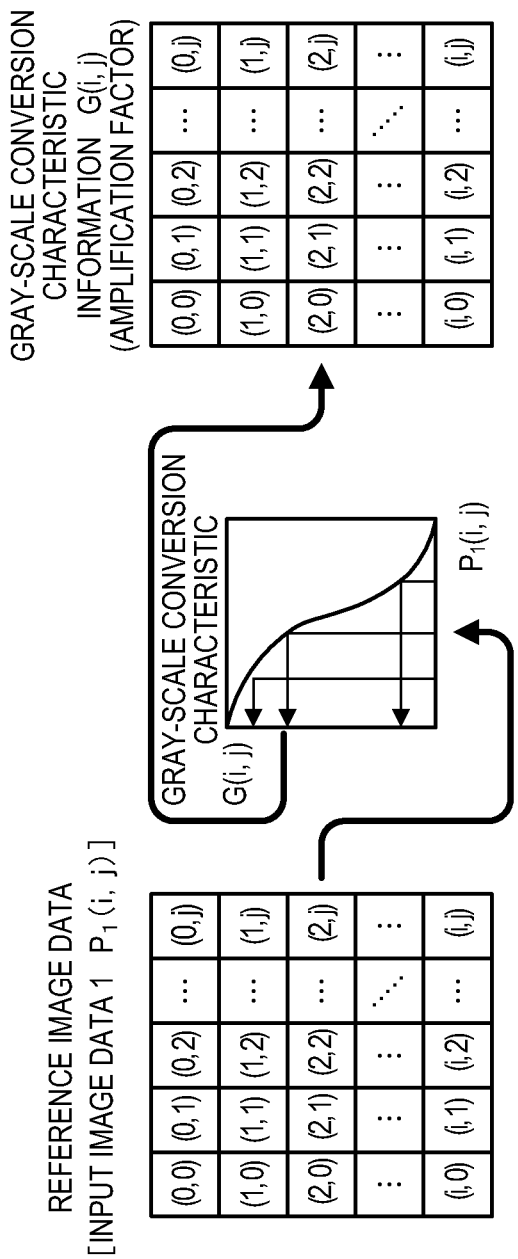
FIG. 4 is a diagram conceptually illustrating a gray-scale conversion characteristic derived by the image processing unit and how to derive gray-scale conversion characteristic information from reference image data based on the gray-scale conversion characteristic.

FIG. 4 is a diagram illustrating an exemplary gray-scale conversion characteristic derived by the gray-scale conversion characteristic deriving unit 310. As described above, in the present embodiment, it is assumed that the reference image data is the input image data 1. The gray-scale conversion characteristic deriving unit 310 analyzes the reference image data to derive the gray-scale conversion characteristic (gradation conversion characteristic). Here, the gray-scale conversion characteristic information derived for the pixel value $P_1(i,j)$ in the pixel position (i,j) of the reference image data (input image data 1) is denoted by $G(i,j)$. That is, the gray-scale conversion characteristic is a characteristic for deriving the gray-scale conversion characteristic information $G(i,j)$ corresponding to each pixel value $P_1(i,j)$. The graph in the center of FIG. 4 conceptually illustrates an exemplary gray-scale conversion characteristic, in which the abscissa denotes the pixel value $P_1(i,j)$ of the reference image data, and the ordinate denotes a value of the gray-scale conversion characteristic information $G(i,j)$.

The gray-scale conversion characteristic may be established such that gray-scale conversion characteristic information $G(i,j)$ tends to decrease as the pixel value $P_1(i,j)$ of the reference image data increases. That is, relatively high gray-scale conversion characteristic information $G(i,j)$ is derived for a relatively low (dark) pixel value $P_1(i,j)$, and relatively low gray-scale conversion characteristic information $G(i,j)$ is derived for a relatively high (bright) pixel value $P_1(i,j)$. For example, the derived gray-scale conversion characteristic may be a so-called reversed-S characteristic as illustrated in the graph in the center of FIG. 4. Alternatively, the gray-scale conversion characteristic information $G(i,j)$ may linearly decrease as the pixel value $P_1(i,j)$ increases or may decrease in a concave or convex curve shape. Naturally, the gray-scale conversion characteristic may be variously set depending on a purpose of the image or a photographic shooting situation.

In the present embodiment, the gray-scale conversion characteristic information $G(i,j)$ is treated as an amplification factor. For example, in a case where the exposure bracketing is performed for the input image data 1 to n by setting the correction step to 1 EV and setting the number of exposure to 5 as described above, exposure is performed with the amount of exposure of ×1 (+0 Ev) to ×16 (+4 Ev) with respect to the smallest amount of exposure. The gray-scale conversion characteristic information $G(i,j)$ is set depending on the amount of exposure of ×1 to ×16. The amplification factor may be represented using an antilogarithmic number (in the aforementioned example, real numbers of 1 to 16). In the following description, it is assumed that the amplification factor is given by a logarithmic representation having a base of 2 as in a conventional expression in the field of a photographic technology. Specifically, in the aforementioned example, the amplification factor $G(i,j)$ is set to a real number equal to or greater than 0 and equal to or smaller than 4. At the time of operation in the CPU inside the image processing apparatus, an integer representation format may be employed. However, herein, for convenient description purposes, it is assumed that the amplification factor $G(i,j)$ is a real number equal to or greater than 0.

In a case where exposure is performed stepwise from +0 Ev to +4 Ev through exposure bracketing, the amplification factor $G(i,j)$ may be set to a real number of 0 to 4 as described above. In this case, the threshold values and the number of the threshold values are set based on the number of exposure and the correction step in the exposure bracketing such that the pixel value $P_n(i,j)$ of the input image data is appropriately selected based on a comparison result with the derived gray-scale conversion characteristic information $G(i,j)$. As a result, in a case where a relatively high amplification factor, that is, relatively high gray-scale conversion characteristic information $G(i,j)$ is set for a certain pixel, a pixel value $P_n(i,j)$ of the input image data obtained using a relatively large amount of exposure is selected. On the contrary, in a case where relatively low gray-scale conversion characteristic information is set, the pixel value $P_n(i,j)$ of the input image data obtained with a relatively small amount of exposure is selected.

According to the gray-scale conversion characteristic described above, the $G(i,j)$ is set to decrease as $P_1(i,j)$ increases. Therefore, it is possible to select the pixel value of the synthesized image data as described below by treating the gray-scale conversion characteristic information $G(i,j)$ as an amplification factor. That is, a high amplification factor is selected for a dark pixel of the image obtained using the reference image data, so that a pixel value of the input image data obtained with a relatively large amount of exposure is selected. As a result, it is possible to improve a gray scale in a shadow portion and reduce noise influence. In contrast, for a bright pixel of the image obtained using the reference image data, a low amplification factor is set, so that a pixel value of the input image data obtained with a relatively small amount of exposure is selected. As a result, it is possible to improve a gray scale in a highlight portion. In this manner, it is possible to reproduce a gray scale matching a wider luminance range the object. In addition, it is possible to reduce noise in a shadow portion. In this case, by treating the gray-scale conversion characteristic information $G(i,j)$ as an amplification factor, it is possible to facilitate matching with the correction step in exposure bracketing and thus simplify the gray-scale conversion processing of the image data.

In the embodiment of the present invention, any one of the pixel values $P_1(i,j)$ to $P_n(i,j)$ of a plurality of input image data 1 to n obtained through a series of exposure bracketing processes is selected as a pixel value of each pixel position $(i,j)$ during the image synthesis processing. If each pixel value is selected in this manner, it is possible to obtain a synthesized image just like that subjected to gray-scale conversion. For this reason, a word "gray-scale conversion characteristic" is employed herein.

Figure 5A:
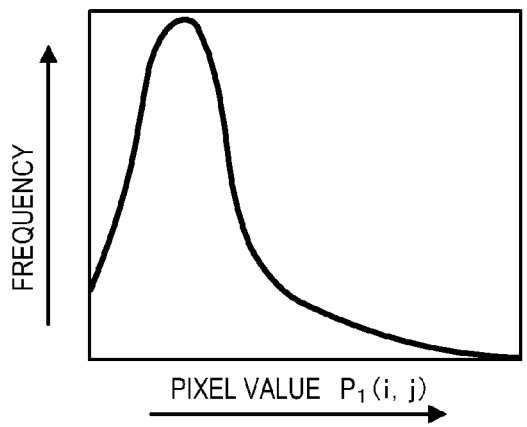
FIG. 5A is a diagram conceptually illustrating an exemplary sequence of deriving the gray-scale conversion characteristic by analyzing the reference image data, in which a histogram of the pixel value of the reference image data is plotted.

Here, description will be made for a method of deriving the gray-scale conversion characteristic using the gray-scale conversion characteristic deriving unit 310. FIG. 5A is an exemplary histogram of the reference image data. In the example of FIG. 5A, it is assumed that image data obtained from a relatively small amount of exposure is set to the reference image data. As a result, the histogram is biased to a lower pixel-value side as a whole.

Figure 5B:
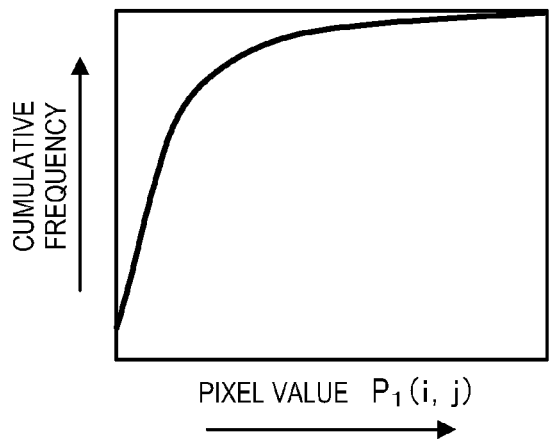
FIG. 5B is a diagram conceptually illustrating an exemplary sequence of deriving the gray-scale conversion characteristic by analyzing the reference image data, in which a cumulative frequency curve of the pixel value of the reference image data is plotted.
Figure 5C:
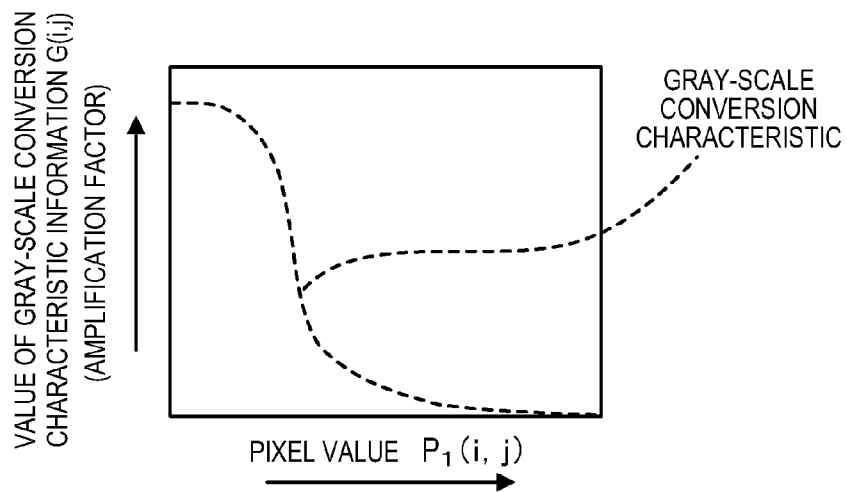
FIG. 5C is a diagram conceptually illustrating an exemplary sequence of deriving the gray-scale conversion characteristic by analyzing the reference image data, in which gray-scale conversion characteristic curves derived based on the cumulative frequency curve of the pixel value of the reference image data are exemplarily plotted.

FIG. 5B illustrates cumulative frequency obtained by analyzing the image data shown in the histogram of FIG. 5A. A cumulative frequency curve of FIG. 5B has a convex curve shape that abruptly rises in an area of lower pixel values and approaches its limitation in an area of higher pixel values from the center. FIG. 5C illustrates an exemplary gray-scale conversion characteristic derived based on the cumulative frequency curve of FIG. 5B. The curve of FIG. 5C is derived based on an inclination of the cumulative frequency curve of FIG. 5B. That is, the curve of FIG. 5C is obtained by differentiating the cumulative frequency characteristic of FIG. 5B with a pixel value (a change rate of the cumulative frequency with respect to change of the pixel value).

The gray-scale conversion characteristic information $G(i,j)$ corresponding to each pixel value $P_1(i,j)$ of the reference image data is derived based on the gray-scale conversion characteristic of FIG. 5C. In the example of FIG. 5C, the following characteristic is obtained. That is, in the example of FIG. 5C, the gray-scale conversion characteristic has a reversed-S curve shape. As a result, relatively high gray-scale conversion characteristic information $G(i,j)$ is derived for a relatively low pixel value $P_1(i,j)$, and relatively low gray-scale conversion characteristic information $G(i,j)$ is derived for a relatively high pixel value $P_1(i,j)$. In addition, in the intermediate range of the pixel value $P_1(i,j)$, the gray-scale conversion characteristic information $G(i,j)$ remarkably decreases even for an insignificant increase of the pixel value $P_1(i,j)$. As a result, if the gray-scale conversion characteristic of FIG. 5C is applied, a pixel value of the input image data obtained with a relatively large amount of exposure is selected for a pixel having a relatively smaller pixel value in the reference image data. In addition, a pixel value of the input image data obtained with a relatively small amount of exposure is selected for a pixel having a relatively higher pixel value in the reference image data. In the image obtained in this manner, noise is reduced in a low luminance portion, and a highlight phenomenon is suppressed in a high luminance portion. In the intermediate range, it is possible to allocate more gray scales and thus improve contrast. Therefore, it is possible to obtain a distinguishable view.

The method of deriving the gray-scale conversion characteristic described in conjunction with FIG. 5 is just exemplary, and the gray-scale conversion characteristic may be derived based on other methods.

The following method may be performed in the process of deriving the gray-scale conversion characteristic information $G(i,j)$ described above. For example, a single gray-scale conversion characteristic may be derived across an entire single image based on the method described in conjunction with FIG. 5 by analyzing the pixel values $P_1(i,j)$ of overall reference image data. In this case, a single gray-scale conversion characteristic illustrated in FIG. 5C is derived for the entire single image. Alternatively, as described below, the gray-scale conversion characteristic may be derived in a space-variant manner.

For example, an image formed using the reference image data is divided into an arbitrary number of blocks in a grid shape along intersecting vertical and horizontal axes to establish a plurality of blocks. The processing described in conjunction with FIG. 5 is executed for each of the established blocks to derive the gray-scale conversion characteristic corresponding to each block. Alternatively, in addition to the simple geometrical dividing method described above, an image processing technique such as object recognition may be employed as well in order to establish a plurality of blocks. In this case, if an object exists, an interested area is established as a single area. In other areas, for example, a priority may be set depending on a distance or brightness from the area where a main object exists to perform the dividing depending on the set priority level. As described above, it is possible to derive the gray-scale conversion characteristic information $G(i,j)$ depending on the pixel values of pixels existing in each block using the gray-scale conversion characteristic derived for each block.

In a case where the image processing unit 300 is integrated into the digital camera 100, the area for deriving the gray-scale conversion characteristic may be established by manipulating a touch panel and selecting a main object and the like while a user sees a live-view image displayed on the display unit 150. Alternatively, in a case where the image processing unit 300 is implemented using the computer 200, the area for deriving the gray-scale conversion characteristic may be established by manipulating a computer mouse and the like while a user sees an image displayed on the display unit 280. Using the gray-scale conversion characteristic derived for each area divided based on any one of the methods described above, it is possible to derive the gray-scale conversion characteristic information $G(i,j)$ for the pixel value $P_1(i,j)$ in each area of the reference image data in a space-variant manner.

Figure 6:
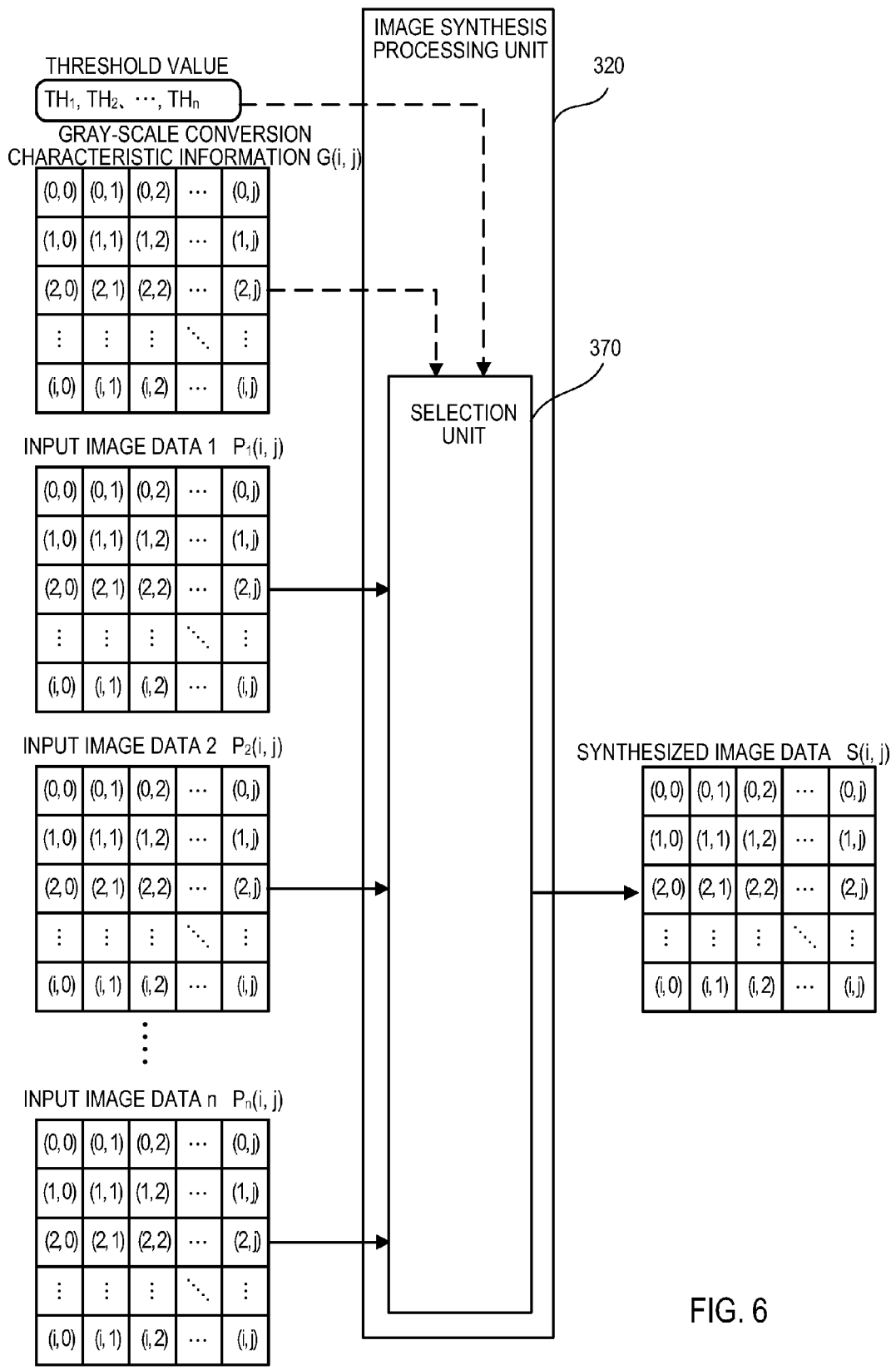
FIG. 6 is a block diagram schematically illustrating an internal configuration of an image synthesis processing unit provided in an image processing unit according to a first embodiment.

FIG. 6 is a block diagram illustrating main parts of the image synthesis processing unit 320. The image synthesis processing unit 320 has a selection unit 370. The selection unit 370 compares the input gray-scale conversion characteristic information $G(i,j)$ and threshold values $TH_1$, $TH_2$, . . . , and $TH_n$ for each pixel position $(i,j)$. Based on the comparison result, the selection unit 370 selects each pixel value $S(i,j)$ of the synthesized image data S from the pixel values $P_1(i,j)$, $P_2(i,j)$, . . . , and $P_n(i,j)$ of the corresponding pixel position $(i,j)$ of the input image data 1 to n. In the following description, the threshold values $TH_1$, $TH_2$, ..., and $TH_n$ will be referred to as threshold values $TH_1$ to $TH_n$.

Figure 7:
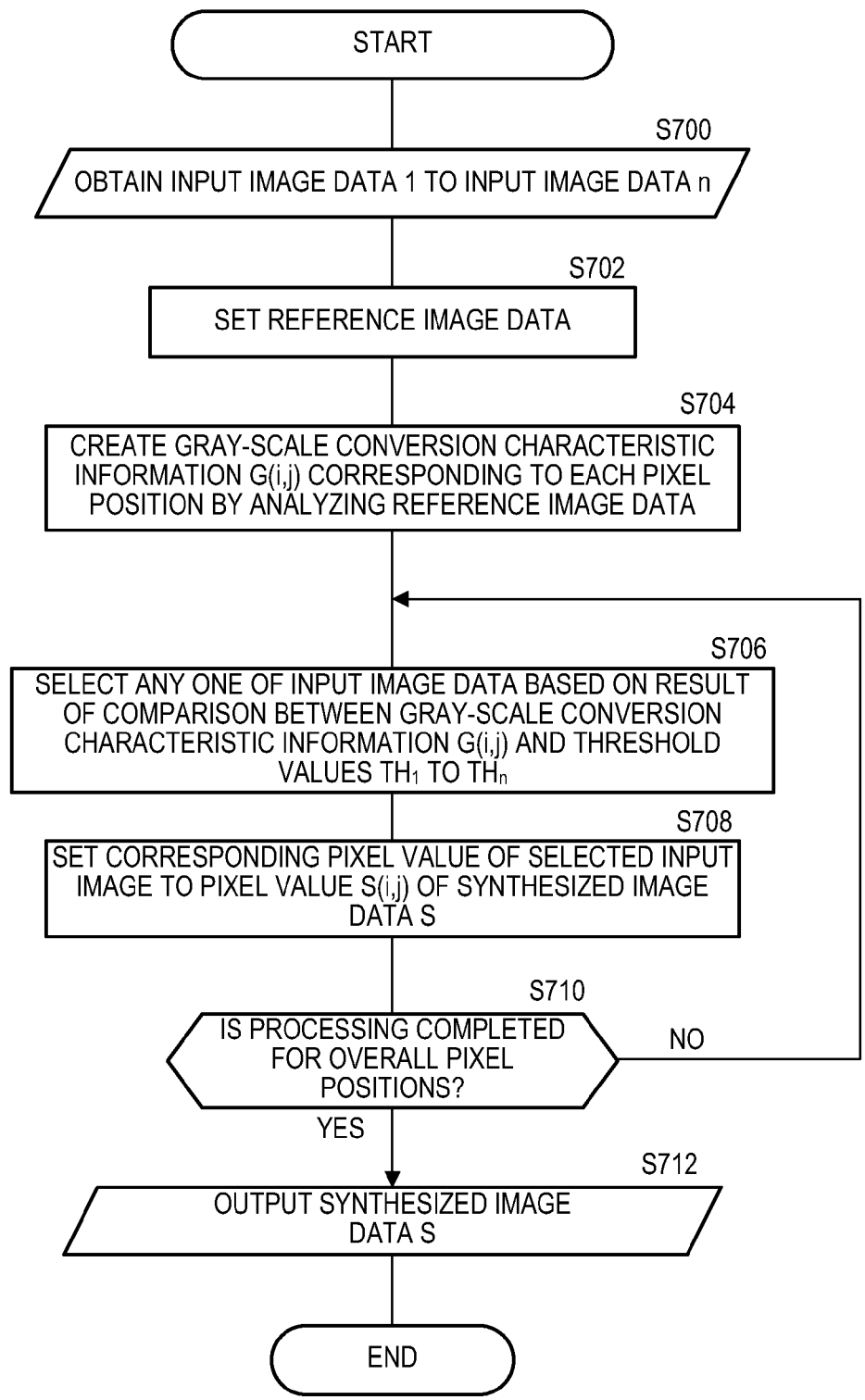
FIG. 7 is a flowchart illustrating an image synthesis processing sequence executed by the image processing unit according to the first embodiment.

FIG. 7 is a flowchart illustrating a processing sequence of the image synthesis processing executed by the image processing unit 300. In a case where the image processing unit 300 is integrated into the digital camera 100, the processing sequence of FIG. 7 is executed after a series of exposure bracketing processes are performed by the digital camera 100. Alternatively, the processing sequence of FIG. 7 may be executed when a user selects a menu for executing a synthesis processing using the input image data obtained through the exposure bracketing and recorded in the image recording medium 130 in the past. In a case where the image processing unit 300 is implemented by the computer 200, the processing sequence of FIG. 7 is executed when image processing software is executed on a computer 200, and a user selects a menu for executing a synthesis processing using the input image data stored in the subsidiary memory unit 230. The processing sequence of FIG. 7 may be executed by hardware, software, or a combination thereof.

In step S700, the image processing unit 300 obtains a plurality of input image data 1 to n. In step S702, the image processing unit 300 sets any one out of the input image data 1 to n as the reference image data. In the present embodiment, as described above, it is assumed that the input image data 1 obtained using the smallest amount of exposure in a series of exposure bracketing processes is set to the reference image data.

In step S704, the image processing unit 300 analyzes the reference image data to create the gray-scale conversion characteristic information $G(i,j)$ corresponding to each pixel position $(i,j)$. In the present embodiment, as described above, it is assumed that the gray-scale conversion characteristic information $G(i,j)$ is treated as an amplification factor. Details of the sequence of creating the gray-scale conversion characteristic information $G(i,j)$ are similar to those described above in conjunction with FIGS. 4 and 5. In this case, the gray-scale conversion characteristic information $G(i,j)$ may be obtained by analyzing pixel values of overall reference image data. Alternatively, the gray-scale conversion characteristic information $G(i,j)$ may be obtained in a space-variant manner by dividing the reference image data into a plurality of areas and analyzing the image data for each divided area.

In step S706, the image processing unit 300 compares the gray-scale conversion characteristic information $G(i,j)$ in a predetermined pixel position $(i,j)$ out of the gray-scale conversion characteristic information $G(i,j)$ created in step S704 with threshold values $TH_1$ to $TH_n$. Based on this comparison result, the image processing unit 300 selects any one out of the input image data 1 to n as a target for extracting a pixel value corresponding to a predetermined pixel position $(i,j)$.

In step S708, the image processing unit 300 extracts the pixel value corresponding to a predetermined pixel position $(i,j)$ from the input image data selected in step S706 and sets the extracted pixel value as the pixel value $S(i,j)$ of the synthesized image data S.

The image processing unit 300 determines, in step S710, whether or not the processes in steps S706 and S708 described above are performed for overall pixel positions $(i,j)$. While it is determined NO in step S710, the processes from step S106 to step S710 are repeated. Meanwhile, if it is determined YES in step S710, the image processing unit 300 performs a process of outputting the synthesized image data S in step S712. As a result, the image based on the synthesized image data S is recorded in the image recording unit 360 as illustrated in FIG. 3. In addition, the image based on the synthesized image data S is displayed on the display unit 350 as necessary.

As described above, the gray-scale conversion characteristic is derived from the reference image data, and the gray-scale conversion characteristic information $G(i,j)$ is created based on the gray-scale conversion characteristic. The gray-scale conversion characteristic information $G(i,j)$ and the threshold values $TH_1$ to $TH_n$ are compared for each pixel position $(i,j)$. As a result, any one of the input image data 1 to n is selected, and a pixel value in the corresponding pixel position of the selected input image data is set to the pixel value $S(i,j)$ of the synthesized image data S. In this manner, since the pixel value is extracted for each pixel by selecting one of n images obtained with a different amount of exposure to create a HDR image, it is possible to create the HDR image with a gray-scale conversion characteristic suitable for a scene. In this case, since the pixel value $P_n(i,j)$ corresponding to the input image data represented by a predetermined bit depth is set to the corresponding pixel value $S(i,j)$ of the synthesized image S represented by the same bit depth, it is possible to perform a process of obtaining the synthesized image S without increasing the bit depth. Therefore, since the synthesis processing can be made within a bit depth of the resultant synthesized image data, it is possible to suppress a hardware size from increasing.

In this case, as described above, if the gray-scale conversion characteristic is derived in a space-variant manner, it is possible to perform the synthesis processing of an image using a gray-scale conversion characteristic suitable for each area in an image.

Second Embodiment

In the first embodiment, the gray-scale conversion characteristic information $G(i,j)$ and the threshold values $TH_1$ to $TH_n$ are compared for a predetermined pixel position $(i,j)$ of the synthesized image data S, and any one of a plurality of input image data 1 to n is selected. In addition, the pixel value $P_n(i,j)$ of the corresponding pixel position $(i,j)$ of the selected input image data is set to the pixel value $S(i,j)$ of the corresponding pixel position $(i,j)$ of the synthesized image data S. In contrast, according to the second embodiment, two input image data are selected from a plurality of input image data 1 to n on the basis of the comparison result between the gray-scale conversion characteristic information $G(i,j)$ and the threshold values $TH_1$ to $TH_n$ for a predetermined pixel position $(i,j)$ of the synthesized image data S. Pixel values (two pixel values) of the corresponding pixel position $(i,j)$ of the two selected input image data are mixed at a mixing ratio derived based on a relationship between the gray-scale conversion characteristic information $G(i,j)$ and a pair of threshold values interposing the value of the gray-scale conversion characteristic information $G(i,j)$. The pixel value obtained through the mixing is set to the pixel value $S(i,j)$ of the corresponding pixel position $(i,j)$ of the synthesized image data S.

The configuration of the image processing unit 300 and the sequence of deriving the gray-scale conversion characteristic information $G(i,j)$ according to the first embodiment described in conjunction with FIGS. 3 to 5 are similarly applied to the second embodiment, and description thereof will not be repeated. Similar to the first embodiment, it is assumed that the gray-scale conversion characteristic information $G(i,j)$ is treated as an amplification factor.

Figure 8:
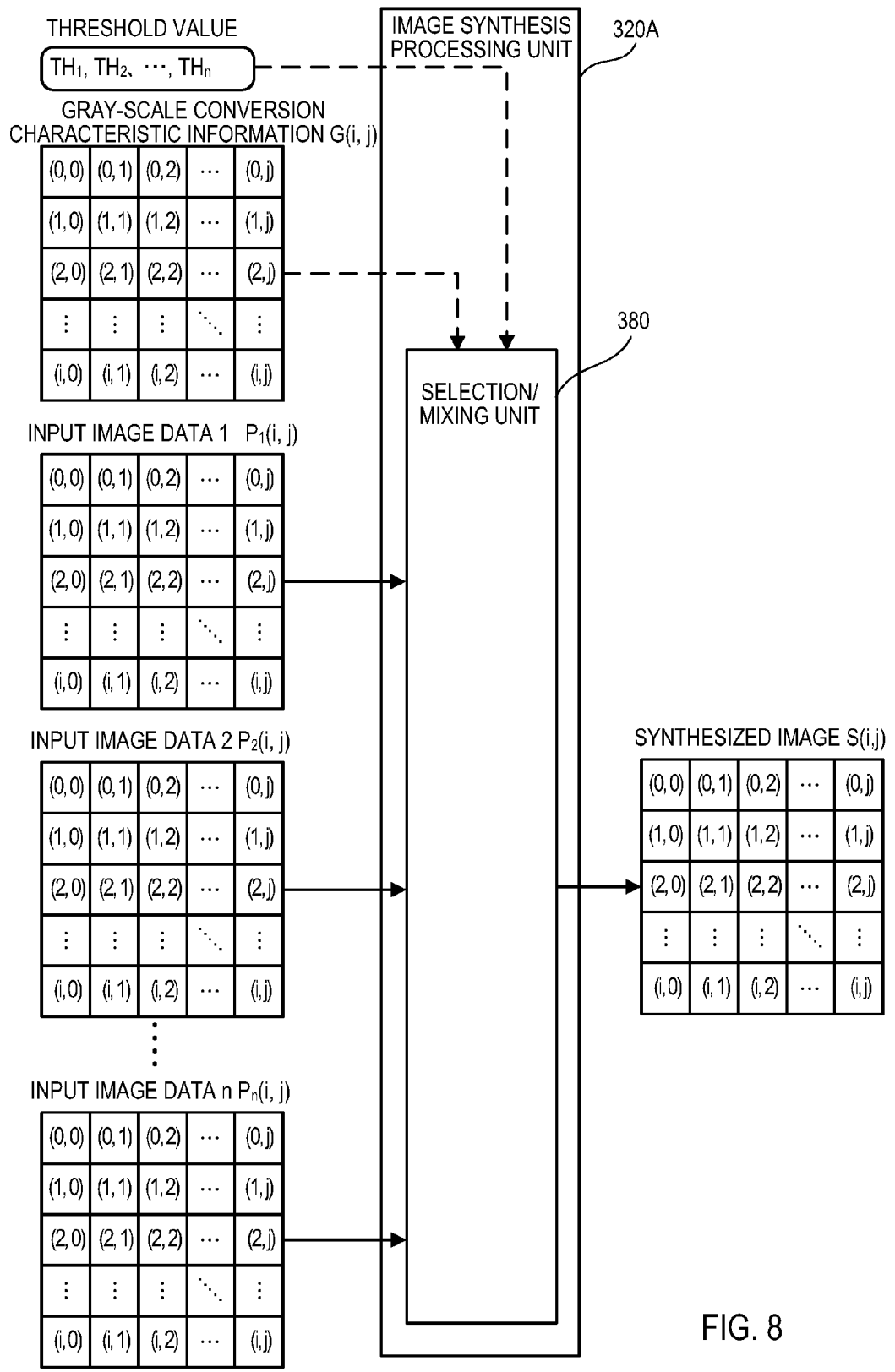
FIG. 8 is a block diagram schematically illustrating an internal configuration of an image synthesis processing unit provided in an image processing unit according to a second embodiment.

FIG. 8 is a block diagram illustrating main parts of the image synthesis processing unit 320A. The image synthesis processing unit 320A is different from the image synthesis processing unit 320 of the first embodiment in that a selection/mixing unit 380 is provided instead of the selection unit 370. Other parts are similar to those of the first embodiment. The selection/mixing unit 380 compares the input gray-scale conversion characteristic information G(i,j) with the threshold values $TH_1$ to $TH_n$. Based on the comparison result, the selection/mixing unit 380 selects two input image data from the input image data 1 to n. In addition, the selection/mixing unit 380 performs a process of mixing pixel values of the corresponding pixel position (i,j) of the two selected input image data as described below with reference to FIG. 9 to create the synthesized image data S.

Figure 9:
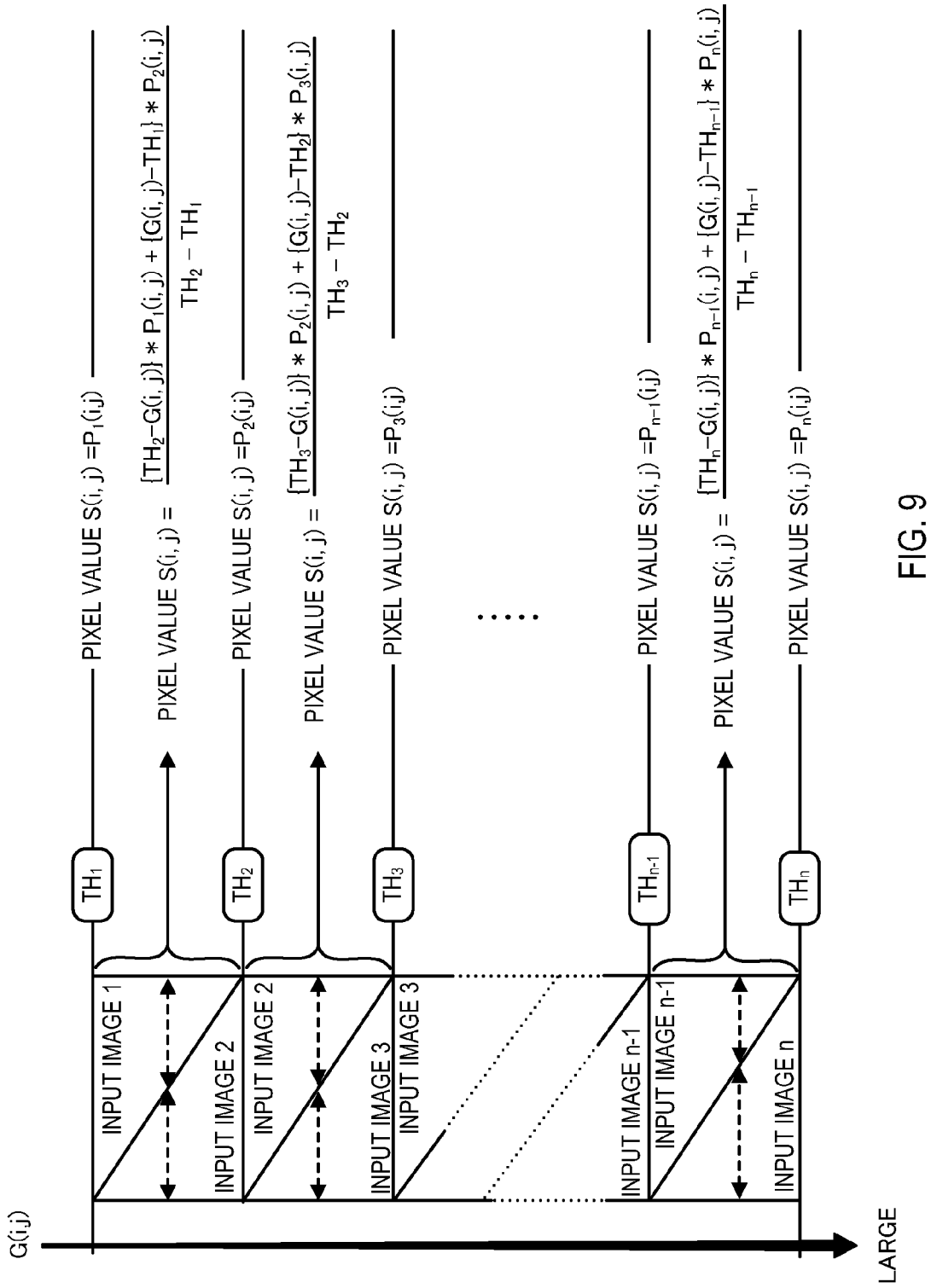
FIG. 9 is a diagram conceptually illustrating an image selection/mixing process performed by the image synthesis processing unit provided in the image processing unit according to the second embodiment.

FIG. 9 is a diagram conceptually illustrating a process of mixing two pixel values of the two input image data selected by the selection/mixing unit 380. In FIG. 9, the threshold values $TH_1$ to $TH_n$ are set depending on the correction step and the number of exposure in the exposure bracketing. In this case, a value of the gray-scale conversion characteristic information G(i,j) may be lower than the threshold value $TH_1$ or higher than the threshold value $TH_n$. In a case where the value of the gray-scale conversion characteristic information G(i,j) is lower than the threshold value $TH_1$, it is assumed that the gray-scale conversion characteristic information G(i,j) is clipped to the threshold value $TH_1$. In addition, in a case where the gray-scale conversion characteristic information G(i,j) is higher than the threshold value $TH_n$, it is assumed that the gray-scale conversion characteristic information G(i,j) is clipped to the threshold value $TH_n$. In FIG. 9, the value of the gray-scale conversion characteristic information G(i,j) increases as the number n increases. In addition, in the equations of FIG. 9, the reference symbol * denotes multiplication (the same applies hereinafter unless specified otherwise).

In a case where a value of the gray-scale conversion characteristic information G(i,j) is equal to or higher than the threshold value $TH_1$ and equal to or lower than the threshold value $TH_2$, the input image data 1 and the input image data 2 are selected. Pixel values $P_1(i,j)$ and $P_2(i,j)$ corresponding to a predetermined pixel position (i,j) of the input image data 1 and 2 are mixed using following Equation (1), so that the pixel value (i,j) of the corresponding pixel position (i,j) of the synthesized image S is derived.

$$\text{Pixel Value } S(i, j) = \frac{[TH_2 - G(i, j)] * P_1(i, j) + [G(i, j) - TH_1] * P_2(i, j)}{TH_2 - TH_1} \quad (1)$$

As apparent from Equation (1), as the value of the gray-scale conversion characteristic information G(i,j) approaches the threshold value $TH_1$, the mixing ratio of the pixel value $P_1(i,j)$ of the input image data 1 increases. In addition, when the value of the gray-scale conversion characteristic information G(i,j) is equal to the threshold value $TH_1$, the mixing ratio of the pixel value $P_1(i,j)$ of the input image data 1 becomes 100%, and the pixel value S(i,j) becomes equal to the pixel value $P_1(i,j)$. In contrast, as the value of gray-scale conversion characteristic information G(i,j) approaches the threshold value $TH_2$, the mixing ratio of the pixel value $P_2(i,j)$ of the input image data 2 increases. When the value of the gray-scale conversion characteristic information G(i,j) is equal to the threshold value $TH_2$, the mixing ratio of the pixel value $P_2(i,j)$ of the input image data 2 becomes 100%, and the pixel value S(i,j) becomes equal to the pixel value $P_2(i,j)$. The sloped solid lines in FIG. 9 indicates a change of the mixing ratio of the pixel values $P_1(i,j)$ and $P_2(i,j)$. In both left and right sides with respect to the sloped line, dotted lines having arrows in both ends are illustrated. These lines indicate the mixing ratios of the pixel values $P_1(i,j)$ and $P_2(i,j)$ of the input image data 1 and 2 corresponding to a predetermined value of the gray-scale conversion characteristic information G(i,j).

In a case where the value of the gray-scale conversion characteristic information G(i,j) exceeds the threshold value $TH_2$ and is equal to or lower than the threshold value $TH_3$, the input image data 2 and the input image data 3 are selected. Pixel values $P_2(i,j)$ and $P_3(i,j)$ corresponding to a predetermined pixel position (i,j) of the input image data 2 and 3 are mixed using following Equation (2), so that the pixel value S(i,j) of the corresponding pixel position (i,j) of the synthesized image S is derived.

$$\text{Pixel Value } S(i, j) = \frac{[TH_3 - G(i, j)] * P_2(i, j) + [G(i, j) - TH_2] * P_3(i, j)}{TH_3 - TH_2} \quad (2)$$

As apparent from Equation (2), as the value of the gray-scale conversion characteristic information G(i,j) approaches the threshold value $TH_2$, the mixing ratio of the pixel value $P_2(i,j)$ of the input image data 2 increases. When the value of the gray-scale conversion characteristic information G(i,j) infinitely approaches to the threshold value $TH_2$, the mixing ratio of the pixel value $P_2(i,j)$ of the input image data 2 approaches 100%, and the pixel value S(i,j) becomes infinitely equal to the pixel value $P_2(i,j)$. In contrast, as the value of the gray-scale conversion characteristic information G(i,j) approaches the threshold value $TH_3$, the mixing ratio of the pixel value $P_3(i,j)$ of the input image data 3 increases. When the value of the gray-scale conversion characteristic information G(i,j) is equal to the threshold value $TH_3$, the mixing ratio of the pixel value $P_3(i,j)$ of the input image data 3 becomes 100%, and the pixel value S(i,j) becomes equal to the pixel value $P_3(i,j)$.

Similarly, in a case where the value of the gray-scale conversion characteristic information G(i,j) exceeds the threshold value $TH_{n-1}$ and is equal to or lower than the threshold value $TH_n$, the input image data n−1 and the input image data n are selected. Pixel values $P_{n-1}(i,j)$ and $P_n(i,j)$ corresponding to a predetermined pixel position (i,j) of the input image data n−1 and n are mixed using following Equation (3), so that the pixel value S(i,j) of the corresponding pixel position (i,j) of the synthesized image S is derived.

$$\text{Pixel Value } S(i, j) = \frac{[TH_3 - G(i, j)] * P_{n-1}(i, j) + [G(i, j) - TH_{n-1}] * P_n(i, j)}{TH_n - TH_{n-1}} \quad (3)$$

As apparent from Equation (3), as the value of the gray-scale conversion characteristic information G(i,j) approaches the threshold value $TH_{n-1}$, the mixing ratio of the pixel value $P_{n-1}(i,j)$ of the input image data n−1 increases. When the value of the gray-scale conversion characteristic information G(i,j) infinitely approaches to the threshold value $TH_{n-1}$, the mixing ratio of the pixel value $P_{n-1}(i,j)$ of the input image data n−1 approaches 100%, and the pixel value S(i,j) becomes infinitely equal to the pixel value $P_{n-1}(i,j)$. In contrast, as the value of the gray-scale conversion characteristic information G(i,j) approaches the threshold value $TH_n$, the mixing ratio of the pixel value $P_n(i,j)$ of the input image data n increases. When the value of the gray-scale conversion characteristic information G(i,j) is equal to the threshold value $TH_n$, the mixing ratio of the pixel value $P_n(i,j)$ of the input image data n becomes 100%, and the pixel value S(i,j) becomes equal to the pixel value $P_n(i,j)$.

As described above, when the value of the gray-scale conversion characteristic information G(i,j) is equal to the threshold value $TH_n$, the pixel value S(i,j) of the derived synthesized image S becomes equal to the pixel value $P_n(i,j)$ of the input image data n. In addition, when the value of the gray-scale conversion characteristic information G(i,j) is set to the value between a pair of neighboring threshold values $TH_{n-1}$ and $TH_n$, the pixel values $P_{n-1}(i,j)$ and $P_n(i,j)$ of the input image data n-1 and n are mixed at a mixing ratio derived based on a pair of the threshold values $TH_{n-1}$ and $TH_n$ and the value of the gray-scale conversion characteristic information G(i,j).

Figure 10:
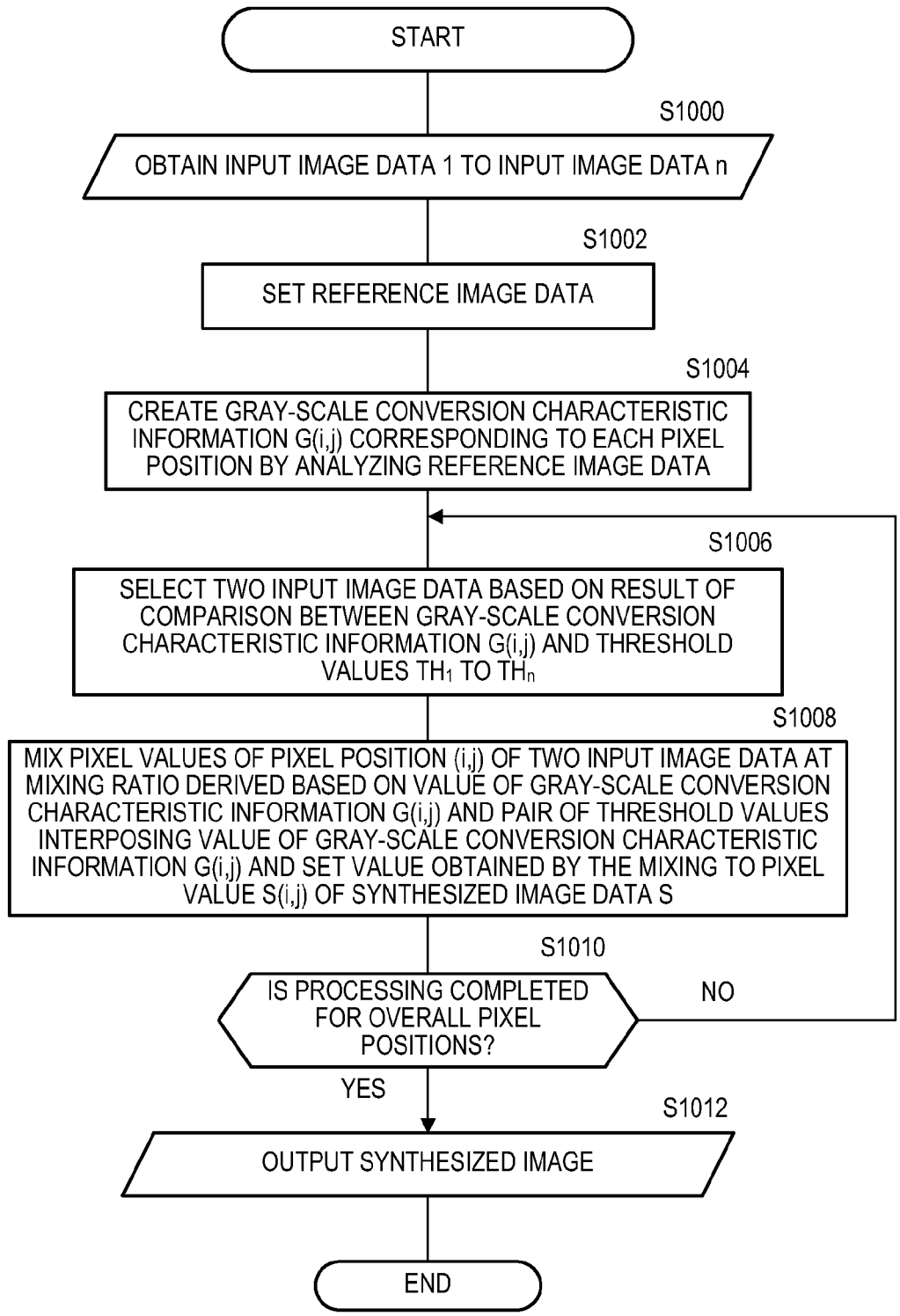
FIG. 10 is a flowchart illustrating an image synthesis processing sequence executed by the image processing unit according to the second embodiment.

FIG. 10 is a flowchart illustrating a processing sequence of the image synthesis processing executed by the image processing unit 300. Similar to the first embodiment, in a case where the image processing unit 300 is integrated into the digital camera 100, the processing sequence of FIG. 10 is executed after a series of exposure bracketing processes are performed using the digital camera 100. Alternatively, the processing sequence of FIG. 10 is executed when a user selects a menu for executing a synthesis processing using the input image data obtained through the exposure bracketing and recorded in the image recording medium 130 in the past. In a case where the image processing unit 300 is implemented by the computer 200, the processing sequence of FIG. 10 is executed when image processing software is executed on a computer 200, and a user selects a menu for executing a synthesis processing using the input image data stored in the subsidiary memory unit 230. The processing sequence of FIG. 10 may be executed by hardware or software.

In step S1000, the image processing unit 300 obtains the input image data 1 to n. In step S1002, the image processing unit 300 sets any one out of the input image data 1 to n as the reference image data. In the present embodiment, it is assumed that the input image data 1 obtained using the smallest amount of exposure in a series of exposure bracketing processes is set to the reference image data.

In step S1004, the image processing unit 300 analyzes the reference image data to create the gray-scale conversion characteristic information G(i,j) corresponding to each pixel position (i,j). Similarly, in the second embodiment, it is assumed that the gray-scale conversion characteristic information G(i,j) is treated as an amplification factor. Details of the sequence of creating the gray-scale conversion characteristic information G(i,j) are similar to those described above in conjunction with FIGS. 4 and 5. Similar to the first embodiment, the gray-scale conversion characteristic information G(i,j) may be obtained by analyzing pixel values of overall reference image data or may be obtained in a space-variant manner.

In step S1006, the image processing unit 300 compares the gray-scale conversion characteristic information G(i,j) in a predetermined pixel position (i,j) out of the gray-scale conversion characteristic information G(i,j) created in step S1004 with threshold values $TH_1$ to $TH_n$. Based on this comparison result, the image processing unit 300 selects two input image data out of the input image data 1 to n as a target for extracting a pixel value corresponding to a predetermined pixel position (i,j) as described above in conjunction with FIG. 9.

In step S1008, the image processing unit 300 extracts the pixel value corresponding to a predetermined pixel position (i,j) from the two input image data selected in step S1006, performs a mixing process, and sets the extracted pixel value as the pixel value S(i,j) of the synthesized image data S. The mixing ratio in the mixing process described above is set as described in conjunction with FIG. 9. That is, the pixel values of the two input image data are mixed at a mixing ratio derived based on the value of the gray-scale conversion characteristic information G(i,j) corresponding to a predetermined pixel position (i,j) and a pair of threshold values interposing this value of the gray-scale conversion characteristic information G(i,j), and the value obtained through the mixing is set to the pixel value S(i,j) of the synthesized image data S.

The image processing unit 300 determines, in step S1010, whether or not the processes in steps S1006 and S1008 described above are performed for overall pixel positions (i,j). While it is determined NO in step S1010, the processes from S1006 and S1010 are repeated. Meanwhile, if it is determined YES in step S1010, the image processing unit 300 performs a process of outputting the synthesized image data S in step S1012. As a result, the image based on the synthesized image data S is recorded in the image recording unit 360 as illustrated in FIG. 3. In addition, the image based on the synthesized image data S is displayed on the display unit 350 as necessary.

Similarly, according to the second embodiment, the gray-scale conversion characteristic is derived from the reference image data, and the gray-scale conversion characteristic information G(i,j) is created based on the gray-scale conversion characteristic as described above. The gray-scale conversion characteristic information G(i,j) and the threshold values $TH_1$ to $TH_n$ are compared for each pixel position (i,j). As a result of the comparison, two input image data are selected out of a series of input image data 1 to n obtained through exposure bracketing. As described above in conjunction with FIG. 9, the selected input image data are input image data corresponding to a pair of threshold values $TH_{n-1}$ and $TH_n$ interposing the value of the gray-scale conversion characteristic information G(i,j). The pixel values $P_{n-1}(i,j)$ and $P_n(i,j)$ of the two input image data are mixed at a mixing ratio obtained based on the value of the gray-scale conversion characteristic information G(i,j) and a pair of the threshold values $TH_{n-1}$ and $TH_n$ interposing this value using any one of Equations (1), (2), and (3) described above. The value obtained in this manner is set to the pixel value S(i,j) of the synthesized image data S.

If an image is formed through the aforementioned mixing process based on the synthesized image data S created in this manner, it is possible to suppress generation of an artifact in addition to the effects of the first embodiment. That is, a change of brightness becomes smooth in the image formed from the synthesized image data. Therefore, it is possible to suppress generation of an abnormal phenomenon such as a tone jump in which a gray scale unnaturally changes in an image in which a tone delicately changes as in a human skin.

Hereinbefore, in the second embodiment, description has been made for an example in which two input image data are selected based on the gray-scale conversion characteristic information G(i,j), and the pixel values of these input image data are mixed. However, the invention is not limited thereto. That is, three or more input image data may be selected based on the gray-scale conversion characteristic information G(i,j), and the pixel values of these input image data may be mixed.

In the description of FIG. 9, it is described that the minimum value of the gray-scale conversion characteristic information G(i,j) may be lower than the threshold value $TH_1$ or may be higher than the threshold value $TH_n$. In this case, the gray-scale conversion characteristic information G(i,j) is clipped to the threshold value $TH_1$ or $TH_n$. That is, in a case where the gray-scale conversion characteristic information G(i,j) is lower than the threshold value $TH_1$, the pixel value S(i,j) is fixed to $P_1(i,j)$. In a case where the gray-scale conversion characteristic information G(i,j) is higher than the threshold value $TH_n$, the pixel value S(i,j) is fixed to $P_n(i,j)$. In this regard, in a case where the gray-scale conversion characteristic information G(i,j) is lower than the threshold value $TH_1$ or is higher than the threshold value $TH_n$, the pixel value S(i,j) may be derived based on the method described below.

In a case where the gray-scale conversion characteristic information G(i,j) is lower than the threshold value $TH_1$, for example, the pixel value S(i,j) may be derived based on following Equation (4).

$$\text{Pixel Value } S(i,j) = G(i,j) * P_1(i,j) \quad (4)$$

If the pixel value is derived based on Equation (4) in a case where the gray-scale conversion characteristic information G(i,j) is lower than the threshold value $TH_1$, the pixel value S(i,j) decreases as the gray-scale conversion characteristic information G(i,j) decreases under the threshold value $TH_1$. As a result, it is possible to widen a reproducible gray-scale range in a dark portion in an image. In addition, in a case where the pixel value S(i,j) is derived based on Equation (4), the threshold value $TH_1$ is preferably set to 1. This is because continuity of the pixel value S(i,j) can be obtained when the value of the gray-scale conversion characteristic information G(i,j) changes in the vicinity of 1, so that it is possible to suppress a tone jump.

In a case where the gray-scale conversion characteristic information G(i,j) is higher than the threshold value $TH_n$, for example, the pixel value S(i,j) may be derived based on following Equation (5).

$$\text{Pixel Value } S(i,j) = G(i,j) * P_n(i,j) * TH_1/TH_n \quad (5)$$

If the pixel value is derived based on Equation (5) in a case where the gray-scale conversion characteristic information G(i,j) is higher than the threshold value $TH_n$, the pixel value S(i,j) increases as the gray-scale conversion characteristic information G(i,j) increases over the threshold value $TH_n$. As a result, it is possible to widen a reproducible gray-scale range in a bright portion in an image. Similarly, in a case where the pixel value S(i,j) is derived based on Equation (5), the threshold value $TH_1$ is preferably set to 1 due to the reason described in conjunction with Equation (4).

In the first and second embodiments described above, the pixel value $P_n(i,j)$ of the input image data has not been described in detail for convenient description purposes. Specifically, the pixel value $P_n(i,j)$ of the input image data may be obtained as follows. In a case where the input image data is so-called RGB image data, the aforementioned processing may be applied to each pixel value of red, green, and blue. In a case where the input image data is represented using a color space such as YCbCr or Lab, the aforementioned processing may be applied to each of Y, Cb, Cr, L, a, and b or may be applied only to values Y and L. This is similarly applied to the input image data represented using other color spaces such as a HSV color space.

In the first and second embodiments described above, description has been made for an example in which the threshold values $TH_1$ to $TH_n$ are set by a user manipulation or automatically based on the correction step and the number of exposure when a series of exposure bracketing processes are performed. In addition, it has been described that the gray-scale conversion characteristic may be derived in a space-variant manner, and the gray-scale conversion characteristic information G(i,j) may be derived from each of the derived gray-scale conversion characteristics. Alternatively, a single gray-scale conversion characteristic may be derived from overall reference image data, the gray-scale conversion characteristic information G(i,j) may be derived for each pixel position (i,j), and the threshold value $TH_1$ to $TH_n$ may be set in a space-variant manner. In this case, the space-variant threshold values $TH_1$ to $TH_n$ may be derived based on a result of analyzing the correction step, the number of exposure, and the reference image data at the time of a series of exposure bracketing processes.

The image processing apparatus described above may be mounted on a digital still camera, a digital movie camera capable of capturing a still image, a camera-equipped mobile phone, a personal digital assistant (PDA), a portable computer, and the like. The image processing apparatus may be implemented by causing a computer to execute the image processing program.

While embodiments of the present invention have been described, the present invention may be variously changed or modified without departing from the scope or spirit of the present invention. Those skilled in the art would appreciate that such changes and modifications are incorporated into the scope of the invention and equivalents thereof as apparent from the appended claims.

What is claimed is:

1. An image processing apparatus comprising:
a gray-scale conversion characteristic deriving unit configured to set reference image data out of a plurality of input image data obtained by shooting an identical object with a different amount of exposure and derive a gray-scale conversion characteristic from the reference image data; and
an image synthesis processing unit configured to derive a new pixel value for each pixel using a pixel value of one or more input image data selected from a plurality of the input image data based on the gray-scale conversion characteristic to create synthesized image data;
wherein the image synthesis processing unit is configured to derive an amplification factor for each pixel value of the reference image data using the gray-scale conversion characteristic, select input image data obtained with an amount of exposure corresponding to a magnitude of the amplification factor, and derive the new pixel value using the pixel value of the selected input image data.

2. The image processing apparatus according to claim 1, wherein the image synthesis processing unit is configured to select two or more input image data with an amount of exposure corresponding to the magnitude of the amplification factor and mix pixel values of the two or more input image data at a mixing ratio derived based on the amplification factor to derive the new pixel value.

3. The image processing apparatus according to claim 2, wherein the image synthesis processing unit is configured to mix pixel values of the two or more input image data at a mixing ratio derived based on the amplification factor and each amount of exposure used to obtain the two or more input image data.

4. The image processing apparatus according to claim 3, wherein the image synthesis processing unit is configured to mix pixel values of the two or more input image data at a mixing ratio derived based on the amplification factor and a threshold value set depending on the number of a plurality of the input image data and the amount of exposure set to obtain each of a plurality of the input image data, the threshold value serving as a selection reference when the two or more input image data are selected from a plurality of the input image data depending on a magnitude of the amplification factor.

5. The image processing apparatus according to claim 1, wherein the image synthesis processing unit is configured to select one of a plurality of the input image data based on the amplification factor and set the pixel value of the selected input image data to the new pixel value for each pixel to create the synthesized image data.

6. The image processing apparatus according to claim 5, wherein the image synthesis processing unit is configured to select one input image data with an amount of exposure corresponding to the magnitude of the amplification factor out of a plurality of the input image data.

7. The image processing apparatus according to claim 6, wherein the image synthesis processing unit is configured to select the one input image data based on a comparison result between the amplification factor and a threshold value set depending on the amount of exposure set to obtain each of a plurality of the input image data and the number of a plurality of the input image data.

8. The image processing apparatus according to claim 1, wherein the gray-scale conversion characteristic deriving unit is configured to derive the gray-scale conversion characteristic depending on image data in each of divided areas of the reference image data.

9. An image processing method comprising:
setting reference image data from a plurality of input image data obtained by shooting an identical object with a different amount of exposure;
deriving a gray-scale conversion characteristic from the reference image data; and
deriving a new pixel value for each pixel using a pixel value of one or more input image data selected from a plurality of the input image data based on the gray-scale conversion characteristic to create synthesized image data;
wherein an amplification factor is derived for each pixel value of the reference image data using the gray-scale conversion characteristic, select input image data is obtained with an amount of exposure corresponding to a magnitude of the amplification factor, and the new pixel value is derived using the pixel value of the selected input image data.

10. A computer readable recording device having an image processing program encoded and recorded in a computer readable format to create synthesized image data having an improved gray scale by synthesizing a plurality of input image data obtained by shooting an identical object with a different amount of exposure,
wherein the image processing program causes a computer to execute a method including:
setting reference image data from a plurality of input image data;
deriving a gray-scale conversion characteristic from the reference image data; and
deriving a new pixel value for each pixel using a pixel value of one or more input image data selected from a plurality of the input image data based on the gray-scale conversion characteristic to create synthesized image data;
wherein an amplification factor is derived for each pixel value of the reference image data using the gray-scale conversion characteristic, select input image data is obtained with an amount of exposure corresponding to a magnitude of the amplification factor, and the new pixel value is derived using the pixel value of the selected input image data.

11. A photographic imaging apparatus comprising:
an image pickup unit capable of photoelectrically converting an object image formed by a photographic lens to output an image signal;
a shooting control unit configured to obtain a plurality of input image data by shooting an identical object with a different amount of exposure using the image pickup unit;
a grayscale conversion characteristic deriving unit configured to set reference image data out of a plurality of the input image data and derive a gray-scale conversion characteristic from the reference image data; and
an image synthesis processing unit configured to derive a new pixel value for each pixel using a pixel value of one or more input image data selected from a plurality of the input image data based on the gray-scale conversion characteristic to create synthesized image data;
wherein the image synthesis processing unit is configured to derive an amplification factor for each pixel value of the reference image data using the gray-scale conversion characteristic, select input image data obtained with an amount of exposure corresponding to a magnitude of the amplification factor, and derive the new pixel value using the pixel value of the selected input image data.

* * * * *